United States Patent
Takahashi et al.

(10) Patent No.: US 6,187,704 B1
(45) Date of Patent: *Feb. 13, 2001

(54) PROCESS FOR MAKING HEATER MEMBER

(75) Inventors: Yoshitomo Takahashi, Fujisawa; Hiroaki Wada, Kawasaki; Akira Satou, Iruma, all of (JP)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/138,896

(22) Filed: Aug. 24, 1998

(30) Foreign Application Priority Data

Aug. 27, 1997 (JP) .................................................. 9-231468

(51) Int. Cl.$^7$ ................................................. C04B 35/569
(52) U.S. Cl. ........................... 501/90; 264/625; 264/666; 264/682
(58) Field of Search ............................... 501/90; 264/682, 264/625, 666; 423/345

(56) References Cited

U.S. PATENT DOCUMENTS

| | | | |
|---|---|---|---|
| 3,993,602 | * 11/1976 | Prochazka | 501/90 |
| 4,336,216 | * 6/1982 | Watanabe et al. | 501/90 |
| 4,564,601 | * 1/1986 | Kriegesmann et al. | 501/90 |
| 4,668,452 | * 5/1987 | Watanabe et al. | 501/90 |
| 4,742,029 | * 5/1988 | Kurachi et al. | 501/90 |
| 5,093,039 | * 3/1992 | Kijima et al. | 252/516 |
| 5,094,985 | * 3/1992 | Kijima et al. | 501/88 |
| 5,322,824 | * 6/1994 | Chia | 501/90 |
| 5,470,806 | * 11/1995 | Krstic et al. | 501/90 |
| 5,543,368 | * 8/1996 | Talbert et al. | 501/90 |
| 5,656,213 | * 8/1997 | Sakaguchi et al. | 501/90 |
| 5,892,236 | * 4/1999 | Takahashi et al. | 250/492.21 |
| 6,001,756 | * 12/1999 | Takahashi et al. | 501/90 |
| 6,013,236 | * 1/2000 | Takahashi et al. | 423/345 |

FOREIGN PATENT DOCUMENTS

| | | |
|---|---|---|
| 402199066 | * 8/1990 | (JP) . |
| 4-65361 | 3/1992 | (JP) . |
| 7-241856 | 9/1995 | (JP) . |
| 9-48605 | 2/1997 | (JP) . |
| 411071178 | * 3/1999 | (JP) . |

* cited by examiner

*Primary Examiner*—Karl Group
(74) *Attorney, Agent, or Firm*—Oliff & Berridge, PLC

(57) ABSTRACT

A heater member is formed of a silicon carbide sintered body. The silicon carbide sintered body includes silicon carbide powder and a non-metal-based sintering auxiliary, and is obtained by sintering a homogeneous mixture of the silicon carbide powder and the non-metal-based sintering auxiliary. The silicon carbide sintered body is formed to have a density of 2.9 g/cm$^3$ or higher. Further, the silicon carbide sintered body is preferably obtained by hot pressing, and also preferably has physical properties of a volume resistivity of 10 Ωcm or less and a total content of impurity elements of 1 ppm or less.

26 Claims, No Drawings

PROCESS FOR MAKING HEATER MEMBER

BACKGROUND OF THE INVENTION

1. Field of the Invention

The present invention relates to a heater member formed from silicon carbide, which exhibits high durability in an oxidizing atmosphere, in a vacuum atmosphere, and even in a corrosive atmosphere, and which has excellent temperature uniformity.

2. Description of the Related Art

A metallic material such as a nickel chrome alloy or a carbon material such as graphite is generally employed for a heating body of a heater member used in various types of thermal treatment equipment or in heating furnaces. In these heaters, the metallic material is corroded by oxidation or is partially melted due to heating at temperatures of 1,000° C. or more and cannot withstand use at high temperatures. On the other hand, although carbon materials have excellent heat resistance, they generate carbon monoxide or carbon dioxide when used in an oxidized atmosphere such as in the ambient air and are gradually worn away. For this reason, there exists a drawback in that a sufficient life duration cannot be obtained.

In semiconductor manufacturing processes such as large scale integration (LSI) of recent years, a process for oxidizing a silicon surface, a process for diffusing a dopant element such as phosphorus or boron in silicon, and the like each require heating processing at temperatures of 1,000° C. or higher, and also require the heating of a silicon wafer directly from a lower portion thereof to form various functional films. When a heater member formed of a metallic material or containing a significant amount of a heavy metal is used in such a process, there is a possibility that a wafer be contaminated during the process. Further, gases having special corrosiveness must be used during the various processings or during post-treatment furnace washing. Accordingly, in consideration of the ease of reaction with such gases, it cannot be said that a heater member formed of a metallic material or a heater member formed of a carbon material can be suitably used.

In view of the above-described circumstances, there has been the need for a heater member which is stable in any of various atmospheres, such as an oxidizing atmosphere and a corrosive-gas atmosphere, and which does not cause any contamination due to the metallic elements contained therein. In recent years, a ceramic heater member is used to satisfy this purpose, and particularly, silicon carbide which has a high heat resistance has come to be noticed. Silicone carbide currently used is porous silicone carbide which causes relatively less contamination by metal and which can be obtained without the addition of a metal-based sintering auxiliary. However, this material has drawbacks in that abnormal heat generation is caused by localized non-uniformity of the resistance distribution and deterioration in performance over time is caused by a reduction in the mechanical strength.

In order to overcome the above-described drawbacks, a silicon carbide rich film is formed by chemical vapor deposition (CVD) or physical vapor deposition (PVD) on the surface of a conventional heater member formed of a carbon material or the like, to improve resistance to a corrosive atmosphere and the like. However, in this case, the silicon carbide film is a thin film and thus separates from a base material due to the difference between the coefficients of thermal expansion of the base material and the coating film, thereby resulting in deterioration of durability.

Accordingly, a silicon carbide sintering process and a sintered body with no harmful additives, which are suitable for the above-described fields of application, are desired. For example, there have been proposed the following methods in which a gas or a solution, containing silicon and carbon, is used as a raw material: (1) a method for producing a sintered body in such a manner that very fine powder is formed by vapor phase epitaxy and is used as a material for the sintered body; and (2) a method for producing a plate-shaped molded body (sintered body) directly by vapor phase epitaxy.

However, these methods each have disadvantages in that productivity is low and cost is high. Further, the above method (1) also has disadvantages in that the resultant powder is too fine and particles are apt to be generated even after sintering, and method (2) has disadvantages in that it is difficult to obtain a thick molded body and it is not easy for the obtained molded body to have a volume resistivity of 10 Ωcm or less which is suitable for a heater member.

SUMMARY OF THE INVENTION

The present invention has been devised in view of the above-described circumstances, and an object thereof is to provide a heater member which exhibits high durability in an oxidizing atmosphere, in a vacuum atmosphere, and even in a corrosive atmosphere, and which has excellent uniformity of temperature.

As a result of studies, the present inventors have found that when a sintered body of silicon carbide obtained by a specific production method is used as a heater member, the sintered body exhibits very excellent properties, and the present inventors thus arrived at the present invention.

The heater member of the present invention is formed by a silicon carbide sintered body which has a density of 2.9 $g/cm^3$ or higher and which is obtained by sintering a homogeneous mixture of silicon carbide powder and a non-metal-based sintering auxiliary.

The non-metal-based sintering auxiliary is preferably an organic compound which produces carbon upon heating. Further, the non-metal-based sintering auxiliary may be present in such a manner as to cover the surface of the silicon carbide powder.

The silicon carbide sintered body can be obtained by hot-pressing the mixture in a non-oxidizing atmosphere. The resultant silicon carbide sintered body preferably has a volume resistivity of 10 Ωcm or less.

The silicon carbide powder can be produced by a production process comprising the steps of: solidifying a mixture of a silicon source containing at least one liquid silicon compound, a carbon source containing at least one liquid organic compound that produces carbon upon heating, and a polymerization catalyst or a cross-linking catalyst, to obtain a solid product; and heating and sintering the resultant solid product in a non-oxidizing atmosphere.

The total content of impurity elements contained in the silicon carbide sintered body is preferably 1 ppm or less.

In accordance with the present invention, when the silicon carbide powder is sintered, only a non-metal-based sintering auxiliary is used as the sintering auxiliary, and no metal-based sintering auxiliary comprising a metal such as boron, aluminum or beryllium or a compound thereof and no carbon-based sintering auxiliary such as carbon black or graphite are used. For this reason, there can be provided a heater member which has a high purity sintered body, and which has a low number of foreign matters at grain boundaries, and which, due to the intrinsic properties of silicon carbide, exhibits higher durability even under severe conditions such as an atmosphere of corrosive gas than a conventional carbon material does, and which has excellent uniformity in temperature.

Further, when powder of the silicon carbide sintered body obtained by the production process of the present invention is used as a material for the silicon carbide sintered body, a sintered body of a higher purity can be obtained, and the total content of elements other than silicon, carbon and oxygen can be 1 ppm or less.

DESCRIPTION OF THE PREFERRED EMBODIMENT

The present invention will hereinafter be described in further detail.

Silicon carbide powder used as a raw material for the heater member made of silicon carbide according to the present invention may be α-type, β-type, amorphous type, or a mixture thereof. Particularly, β-type silicon carbide powder is preferably used from the standpoint of the coefficient of thermal expansion of the sintered body. The grade of the β-type silicon carbide powder is not particularly limited. For example, a commercially available β-type silicon carbide powder may be used. It is preferable that the particle diameter of the silicon carbide powder be smaller from the standpoint of achieving high density. The particle diameter of the silicon carbide powder is preferably 0.01 to 5 μm, and more preferably 0.05 to 3 μm. When the particle diameter is smaller than 0.01 μm, handling in processes such as weighing, mixing, and the like becomes difficult. When the particle diameter exceeds 5 μm, the specific surface area thereof becomes small, i.e., the contact area of adjacent particles becomes small, which makes densification difficult, which is not preferable.

A silicon carbide powder having a particle diameter of 0.05 to 1 μm, a specific surface area of 5 $m^2$/g or more, a free carbon content of 1% or less, and an oxygen content of 1% or less is suitably used as the material for a sintered body. Further, the particle size distribution of the silicon carbide powder used is not particularly limited. Silicon carbide powder having two or more size distribution peaks may be used in view of high packing density of the powder and high reactivity of the silicon carbide powder during the manufacturing process of the silicon carbide sintered body.

It is preferable that a high purity silicon carbide sintered body be used for the heater member. In order to obtain a high purity silicon carbide sintered body, it suffices that a high-purity silicon carbide powder be used as the raw material silicon carbide powder.

The high-purity silicon carbide powder can be obtained by a production process including a sintering step for sintering, in a non-oxidizing atmosphere, a solid product obtained by homogeneously mixing, for example, a silicon source containing at least one liquid silicon compound, a carbon source containing at least one liquid organic compound which produces carbon upon heating, and a polymerization or cross-linking catalyst.

The silicon compound used for producing the high-purity silicon carbide powder (the silicon compound will be hereinafter referred to as a silicon source for convenience) may be a combination of a liquid silicon compound and a solid silicon compound, but at least one of the selected silicon compounds must be in liquid form. Examples of liquid silicon compounds include alkoxysilane (mono-, di-, tri-, tetra-) and polymers of tetraalkoxysilane. Among alkoxysilanes, tetraalkoxysilane is advantageously used.

More specifically, methoxysilane, ethoxysilane, propoxysilane, butoxysilane, and the like can be used. However, among these, ethoxysilane is preferably used from the standpoint of handling. Examples of the polymers of tetraalkoxysilane include low molecular weight polymers (oligomers) having a degree of polymerization of 2 to 15, and liquid polymers of silicic acid having high degrees of polymerization. Silicon oxides are examples of solid compounds which can be combined with the above liquid ones. In the present invention, such silicon oxides may be silicon monoxide (SiO), may be silica sol (a colloidal ultra-fine silica containing solution, which contains an OH or alkoxy group therein), may be silicon dioxide (silica gel, fine silica, quartz powder), or the like.

Among these silicon sources, oligomers of tetraethoxysilane, or a mixture of an oligomer of tetraethoxysilane and an ultra-fine powder of silica is suitably used from the standpoints of homogeneity and handling. Further, the silicon sources used herein are high purity substances and preferably contain impurities in an amount of no more than 20 ppm, and more preferably no more than 5 ppm, at an initial stage.

Further, the organic compound which is used for production of the high-purity silicon carbide powder and which produces carbon upon heating may be in a liquid form or may be a mixture of liquid and solid forms. Preferably, the organic compound has a high residual carbon ratio and is polymerized or cross-linked by means of a catalyst reaction or heating. Examples of such organic compounds include monomers and prepolymers of phenol resin, furan resin, and other resins such as polyimide, polyurethane, and polyvinyl alcohol. Moreover, liquid compounds of cellulose, sucrose, pitch, tar, and the like can also be used. Among these, a resol-type phenol resin is most preferably used. The purity of the organic compound can be controlled and selected appropriately in accordance with the purposes. However, when silicon carbide powder of high purity is required, an organic compound which contains metals each in an amount of 5 ppm or less is preferably used.

The ratio between carbon and silicon (which will be hereinafter abbreviated as "C/Si ratio") when the high-purity silicon carbide powder which is a raw material powder used in the present invention is produced is defined by means of elemental analysis of a carbide intermediate obtained by carbonizing the mixture at 1,000° C. Stoichiometrically, when the C/Si ratio is 3.0, there would be 0% free carbon in the produced silicon carbide. However, free carbon is actually generated at a lower C/Si ratio due to vaporization of the SiO gas generated simultaneously. It is important to determine the mixing ratio in advance so that the amount of free carbon in the produced silicon carbide powder does not become inadequate for the purpose of producing a sintered body. In the case of baking at around 1 atm and at 1,600° C. or higher, generation of free carbon can normally be inhibited at a C/Si ratio of 2.0 to 2.5. Accordingly, this range can be advantageously used. When the C/Si ratio is 2.5 or higher, the amount of free carbon increases remarkably. However, the free carbon has the effect of inhibiting the growth of particles, and therefore, the C/Si ratio may be appropriately selected for controlling the degree of particle formation. On the other hand, when baking is carried out at a low or high atmospheric pressure, the C/Si ratio for obtaining pure silicon carbide will vary. In this case, the C/Si ratio is not necessarily limited to the above-described range.

Since free carbon has a very weak effect on sintering as compared with carbon originating from a non-metal-based sintering auxiliary applied to cover the surface of the silicon carbide powder used in the present invention, the overall effect of the free carbon may basically be negligible.

Further, in order to obtain a solid product of a homogenous mixture of the silicon source and the organic compound which produces carbon upon heating in the present invention, a mixture of the silicon source and the organic compound may be solidified to form the solid product. The solidification may be carried out, for example, by means of cross-linking upon heating, by means of curing with a curing catalyst, or by means of an electron or radioactive beam. The curing catalyst may be selected appropriately in accordance with the carbon source used. When the carbon source is a phenol resin or a furan resin, the curing agent may be an acid such as toluene sulfonic acid, toluene carboxylic acid, acetic acid, oxalic acid, hydrochloric acid, or sulfuric acid, or an amine such as hexamine.

The solid product of the raw material mixture may be heated to be carbonized as occasion demands. This is achieved by heating the solid product in a non-oxidizing atmosphere of nitrogen or argon or the like at a temperature of 800° C. to 1,000° C. for 30 to 120 minutes.

The obtained carbonized compound is further heated in a non-oxidizing atmosphere of argon or the like at a temperature between 1,350° C. and 2,000° C. to form silicon carbide. The baking temperature and time may be appropriately selected in accordance with the desired properties such as particle diameter or the like. However, for more effective production, it is preferable that the baking be carried out at a temperature between 1,600° C. and 1,900° C.

Further, in order to obtain a powder of much higher purity, the impurities can be further removed by carrying out heating processing for 5 to 20 minutes at a temperature from 2,000° C. to 2,100° C. during the above-described baking processing.

As a process for producing a silicon carbide powder of particularly high purity, there can be used the process for producing a monocrystal, which is described in Japanese Patent Application No. 9-48605 filed by the present applicant, to produce a raw material powder. More specifically, this is a process for making silicon carbide powder of high purity, which comprises a silicon carbide production step for producing silicon carbide powder by heating and baking in a non-oxidizing atmosphere a homogenous mixture of a silicon source comprising at least one selected from tetraalkoxysilane, polymers of tetraalkoxysilane, and silicon oxide (each should be of high quality), and a carbon source comprising an organic compound of high purity that produces carbon upon heating; and a post-treatment step in which the obtained silicon carbide powder is basically kept at a temperature from equal to or higher than 1,700° C. to lower than 2,000° C. and is heated, at least once, to a temperature between 2,000° C. and 2,100° C. for 5 to 20 minutes during the step, to obtain a silicon carbide powder having an impurity element content of 0.5 ppm or less through the above two steps.

When a silicon carbide sintered body which can be appropriately used for the heater member of the present invention is produced, the non-metal-based sintering auxiliary which is mixed with the above-described silicon carbide powder may be a substance (a so-called carbon source) that produces carbon upon heating. Examples of the carbon source used include organic compounds that produce carbon upon heating and silicon carbide powders (particle diameter: 0.01 to 1 μm) whose surface is covered with these compounds. In terms of effectiveness as the carbon source, the organic compound itself rather than the silicon carbide powder covered therewith is more preferable.

Further, in the present invention, the substance used as the organic compound (which will be hereinafter referred to as the carbon source) which produces carbon upon heating and which is mixed with the above-described silicon carbide powder is a substance which functions to facilitate the reaction by being added as a non-metal-based sintering auxiliary in place of the conventional sintering auxiliaries. Specific examples of such organic compounds include coaltar pitch, phenol resin, furan resin, epoxy resin, phenoxy resin, and various saccharides including monosaccharides such as glucose, oligosaccharides such as sucrose, and polysaccharides such as cellulose and starch, each having a high residual carbon ratio. In order for the organic compound to be mixed homogeneously with the silicon carbide powder (the silicon source), there are suitably used organic compounds which are in the liquid form at room temperature, organic compounds which are dissolved into solvents, or organic compounds which soften or liquefy upon heating such as thermoplastic or thermomelting materials. Among these, phenol resin, particularly resol type phenol resin, is desirable as a molded product of a high strength can be obtained.

When the above-described organic compounds are heated, the organic compounds generate inorganic carbon compounds such as carbon black or graphite on a particle surface (in the vicinity of the surface). The generated inorganic compounds are thought to be effective as sintering auxiliaries which effectively remove an oxide film formed on the surface of the silicon carbide during sintering. Inorganic carbon compounds such as carbon black and graphite which have been conventionally known as sintering auxiliaries cannot achieve the same effect as that obtained by adding the non-metal-based sintering auxiliaries in the present invention.

In the present invention, it is preferable that when the mixture of the silicon carbide powder and the non-metal-based sintering auxiliary is prepared, the non-metal-based sintering auxiliary be dissolved or dispersed in a solvent. The solvent may be a solvent that is suitable for the compound used as the non-metal-based sintering auxiliary. More specifically, the solvent may be a lower alcohol such as ethyl alcohol, or may be ethyl ether, or may be acetone in a case in which phenol resin is used as the organic compound which produces carbon upon suitable heating. It is preferable that the non-metal-based sintering auxiliary and the solvent used contain amounts of impurities as low as possible.

The amount of the non-metal-based sintering auxiliary to be mixed with the silicon carbide powder is preferably adjusted to an amount of 10% or less, more preferably 2 to 5% by weight, although this depends on the type of the non-metal-based sintering auxiliary used, because too small of an amount of the non-metal-based sintering auxiliary prevents the sintered body from becoming dense while an excessively large amount increases the amount of free carbon contained in the sintered body, which also tends to inhibit the sintered body from becoming dense. The adequate amount of the non-metal-based sintering auxiliary may be determined in advance by quantifying the amount of silica (silicon oxide) on the surface of the silicon carbide powder with hydrofluoric acid and calculating a stoichiometrically sufficient amount of the auxiliary to reduce the silica.

Here, the amount of carbon to be added is determined in light of a residual carbon ratio (a ratio of the amount of carbon produced after thermal decomposition of a non-metal-based sintering additive to the amount of the nonmetal-based sintering auxiliary before thermal decomposition) and the like based on the assumption that the silica ($SiO_2$) quantified as described above is reduced by the carbon originated from the non-metal-based sintering additive according to the following equation:

$$SiO_2 + 3C \rightarrow SiC + 2CO$$

The silicon carbide sintered body according to the present invention preferably contains carbon atoms originating from the silicon carbide which is contained in the silicon carbide sintered body itself and carbon atoms originating from the non-metal-based sintering auxiliary, in an amount of more than 30% by weight and less than or equal to 40% by weight. When the content of carbon atoms becomes less than or equal to 30% by weight, the amount of impurities contained in the sintered body increases. When the content of carbon atoms exceeds 40% by weight, the content of carbon atoms becomes high, the density of the resultant sintered body becomes lower, and various properties such as the strength and resistance to oxidation of the sintered body deteriorate, which is not preferable.

When the silicon carbide sintered body according to the present invention is prepared, first, the silicon carbide powder and the non-metal-based sintering auxiliary are mixed homogeneously. As described above, the phenol resin which is the non-metal-based sintering auxiliary is dissolved in a solvent such as ethyl alcohol so that it is mixed well with the silicon carbide powder. The mixing may be carried out by use of known mixing means such as a mixer, a planetary ball mill or the like. It is preferable that the mixing be carried out for 10 to 30 hours, preferably 16 to 24 hours. After mixing sufficiently, the solvent is removed at a temperature compatible with the physical properties (e.g., the boiling point and the like) of the solvent used, for example, at a temperature of 50 to 60° C. for ethyl alcohol described above. The mixture is dried by evaporating the solvent, and the resultant material is sieved to obtain a raw material powder of the mixture. From the viewpoint of achieving high purity, the ball mill and balls must be made of a synthetic resin containing little or no metal. At the time of drying, a granulator such as a spray dryer may be used.

The sintering step which is an essential step in the production process for producing a heater member of the present invention is a step in which the powdery mixture, or a molded body of the powdery mixture obtained in a molding step which will be described later, is placed in a mold in a non-oxidizing atmosphere at a temperature of 2,000 to 2,400° C. and a pressure of 300 to 700 kgf/cm² for hot pressing.

It is preferable, from the viewpoint of the purity of the resultant sintered body, that a material made of graphite or the like be used at a part of or the entire mold or that a sheet of Teflon be placed in the mold so that the molded product and the metal portions of the mold do not directly contact each other.

In the present invention, the hot pressing may be carried out at a pressure of 300 to 700 kgf/cm². In particular, it is necessary to select components for the hot pressing used herein such as a die and a punch having a good pressure resistance when a pressure of 400 kgf/cm² or more is applied.

The sintering step will be described hereinafter in detail. It is preferable that the impurities be sufficiently removed and the carbon sources be carbonized completely by heating and increasing temperature under the following conditions before the hot press step for producing the sintered body by the hot press treatment.

More specifically, it is preferable that a temperature increasing step having the following two stages be carried out. First, the inside of a furnace is heated gradually from room temperature to 700° C. in a vacuum. The temperature may be increased continuously up to 700° C. when it is difficult to control the temperature in the furnace. However, preferably, the inside of the furnace is adjusted to $10^{-4}$ torr and the temperature is increased gradually from room temperature to 200° C., at which the temperature of the furnace is kept for a predetermined time. Then, the temperature is further increased gradually to 700° C. The furnace is kept for a certain time at a temperature around 700° C. (the first temperature increasing stage). In this first temperature increasing stage, absorbed water or a binder is decomposed, and carbonization proceeds as a result of thermal decomposition of the carbon source. The time during which the temperature is kept around 200° C. or around 700° C. is selected to be an adequate range in accordance with the type of the binder and the size of the sintered body. The time when the decrease in the degree of vacuum becomes somewhat slow may be a rough measure to determine whether the holding time is long enough. If the sintered body is abruptly heated in this step, the removal of the impurities and carbonization of the carbon source are not performed sufficiently. This may cause undesirable cracking or voids in the molded body.

As an example, a sample about 5 to 10 g is heated gradually at a pressure of $10^{-4}$ torr from room temperature to 200° C. and is kept at that temperature for about 30 minutes. Subsequently, the sample is heated gradually to 700° C. The time taken to heat the sample from room temperature to 700° C. is from 6 to 10 hours, preferably about 8 hours. It is preferable that the sample is held at a temperature around 700° C. for 2 to 5 hours.

In a vacuum, the sample is heated from 700° C. to 1,500° C. over a period of 6 to 9 hours if the other conditions are set as described above, and the temperature is maintained at 1,500° C. for one to five hours. It is thought that the silicon dioxide and silicon oxide are reduced during this process. It is important to complete this reduction reaction in order to remove the oxygen bonded to the silicon. Thus, the sample must be kept at 1,500° C. until generation of carbon monoxide that is a by-product of this reducing reaction is completed, i.e., until the decrease in the degree of vacuum becomes as little as that observed at around 1,300° C., which is the temperature before the beginning of the reducing reaction (the second temperature increasing stage). The reducing reaction in this second temperature increasing stage contributes to the removal of silicon dioxide that adheres to the surface of the silicon carbide powder to inhibit densification and cause growth of larger particles.

Gases which are generated in this reduction reaction process contain SiO and CO and are accompanied by elements of impurities. These elements of impurities, together with the generated gases, are continuously exhausted into a reactor by the use of a vacuum pump and are removed. Accordingly, it is preferable to keep the temperature high enough for a sufficient time, from the standpoint of achieving a higher purity.

It is preferable that the hot pressing be carried out at a high pressure after completion of the temperature increasing stages. The sintering starts when the temperature exceeds 1,500° C. At this time, application of pressure is started and the pressure is increased to approximately 300 to 700 kgf/cm² in order to inhibit abnormal growth of the particles. Thereafter, an inert gas is introduced into the furnace to provide a non-oxidizing atmosphere in the furnace. The inert gas may be nitrogen or argon. It is, however, preferable that argon be used because argon is not reactive at high temperatures.

After the inside of the furnace is made a non-oxidizing atmosphere, heat and pressure are applied to achieve a temperature of 2,000° C. to 2,400° C. and a pressure of 300 to 700 kfg/cm². The pressure in the pressing step may be adjusted in accordance with the particle diameter of the raw material powder. In the case of a raw material powder having a smaller particle diameter, it is possible to obtain an excellent sintered body at a relatively low applied pressure. The raising of the temperature from 1,500° C. to a highest temperature of 2,000 to 2,400° C. is to be carried out over two to four hours, during which the sintering proceeds rapidly at around 1,850 to 1,900° C. The temperature is kept at this highest temperature for one to three hours to complete the sintering.

Densification may not be sufficient when the highest temperature is lower than 2,000° C. On the other hand, an excessively high temperature exceeding 2,300° C. is not preferable, either, because the raw material of the molded body tends to sublimate or be decomposed. The densification will not be sufficient when the pressure is lower than 500 kgf/cm². On the other hand, pressures of higher than 700 kgf/cm² are not preferable from the standpoint of efficiency of production because such high pressures may cause damage to a mold made of, for example, graphite.

In this sintering step, it is preferable from the standpoint of maintaining high purity of the resultant sintered body that a graphite material of high purity be used for the graphite mold and insulating materials of the heating furnace. The graphite material used is one which has been subjected to purification treatment. More specifically, it is preferable to use a graphite material that has been previously baked well at a temperature equal to or higher than 2,500° C. and that produces few or no impurities at a sintering temperature. In addition, it is also preferable to use an inert gas which is highly purified and contains few or no impurities.

In the present invention, the above-described sintering step provides a silicon carbide sintered body having superior properties. However, in addition, the following molding step may be carried out prior to the sintering step from the standpoint of achieving higher densification of the final sintered body. Such a molding step that may be carried out prior to the sintering step is described below. The molding step is a step in which a raw material powder obtained by homogeneously mixing the silicon carbide powder and a carbon source is placed in a mold and is heated under pressure at a temperature ranging from 80 to 300° C. for 5 to 60 minutes to prepare a molded body. It is preferable that the raw material powder be filled in the mold as densely as possible from the standpoint of higher densification of the final sintered body. This molding step allows a greater amount of the sample powder to be filled in the mold for hot processing than in a case in which the sintering step were to be carried out without this molding step being carried out prior thereto. Accordingly, it is possible to produce a thick or high density molded body.

At a heating temperature ranging from 80 to 300° C., preferably from 120 to 140° C., and under a pressure ranging from 60 to 100 kgf/cm², the raw material powder filled in the mold is pressed to a density of 1.5 g/cm³ or higher, preferably 1.9 g/cm³ or higher, and is kept under this pressure for 5 to 60 minutes, preferably 20 to 40 minutes, to produce a molded body made of the raw material powder. The smaller the average particle diameter is, the more difficult it becomes to increase the density of the molded body. For achieving a higher density of the molded body, it is preferable to use vibration packing or similar methods when placing the powder in the mold. More specifically, the density preferably reaches 1.8 g/cm³ or higher for a powder having an average particle diameter of about 1 μm, and the density preferably reaches 1.5 g/cm³ or higher for a powder having an average particle diameter of about 0.5 μm. Densities lower than 1.5 g/cm³ and 1.8 g/cm³ for particle diameters of 1 μm and 0.5 μm, respectively, make it difficult to increase the density of the final sintered body.

The molded body may be cut so as to fit in a hot press mold before it is subjected to the subsequent sintering step. The molded body is placed in the mold in a non-oxidizing atmosphere at a temperature of 2,000 to 2,400° C. and a pressure of 300 to 700 kgf/cm². The molded body is then subjected to the sintering step where it is hot pressed to obtain a highly pure and highly dense silicon carbide sintered body.

The silicon carbide sintered body produced in the manner described above is sufficiently dense, and has a density of 2.9 g/cm³ or higher. If the density of the resultant sintered body is lower than 2.9 g/cm³, such a low density deteriorates mechanical properties such as bending strength and fracture strength as well as electrical properties, enlarges the particles, and exacerbates contamination. It is more preferable that the silicon carbide sintered body has a density of 3.0 g/cm³ or higher.

When the resultant sintered body is porous, problems arise such as heat resistance, oxidation resistance, chemical resistance and mechanical strength thereof are low, washing of the sintered body is difficult, fine cracks in the sintered body form and the small pieces thereof become contaminants, and the sintered body is gas permeable. Consequently, these problems result in limited applications of the sintered body.

The silicon carbide sintered body obtained in the present invention contains a total amount of impurities of 5 ppm or less, preferably 3 ppm or less, and more preferably 1 ppm or less. However, such impurity contents obtained by means of chemical analyses only have meaning as reference values from the standpoint of application to the semiconductor industrial field. In practice, evaluation varies depending on whether the impurities are distributed uniformly or localized. Accordingly, those skilled in the art typically use various ways to assess to what extent the impurities contaminate heater members under predetermined heating conditions by using devices actually used in practice. In accordance with a production process comprising a step of carbonizing by heating, in a non-oxidizing atmosphere, a solid product obtained by mixing homogeneously a liquid silicon compound, a liquid organic compound that produces carbon upon heating, and a polymerization or cross-linking catalyst, and a subsequent step of baking the carbonized product in the non-oxidizing atmosphere, it is possible to achieve a total content of impurities in the silicon carbide sintered body of 1 ppm or less. Further, it is necessary to select, as the above-described raw material, a material having a proper purity in accordance with the desired purity of the silicon carbide sintered body to be prepared. The term "impurity element" used herein means group 1 to group 16 elements in the periodic table of the 1989 revised version of IUPAC Inorganic Chemistry Nomenclature that have an atomic number of three or greater, except for those elements having an atomic number of 6 to 8 and 14.

Further, as the favorable properties of the silicon carbide sintered body obtained in the present invention, it is preferable that the sintered body has a bending strength at room temperature of 50.0 to 65.0 kgf/mm$^2$, a bending strength at 1,500° C. of 55.0 to 80.0 kgf/mm$^2$, a Young's modules of 3.5×10$^4$ to 4.5×10$^4$, a Vickers hardness of 2,000 kgf/mm$^2$ or higher, a Poisson's ratio of 0.14 to 0.21, a coefficient of thermal expansion of 3.8×10$^{-6}$ to 4.2×10$^{-6}$ (° C.$^{-1}$), a thermal conductivity of 150 W/m·k or higher, a specific heat of 0.15 to 0.18 cal/g·° C., a thermal shock resistance of 500 to 700 ΔT° C., and a resistivity of 1 Ωcm or lower.

The sintered body obtained by the above-described production process may be subjected to treatments such as machining, polishing, and washing as occasion demands. The heater member of the present invention may be produced by forming a cylindrical sample (sintered body) by hot pressing and by slicing it (or by processing it as desired). For such processings, electrical discharge machining is suitably used.

In the production process of the present invention, there are no specific limitations to the production apparatuses as long as the above-described heating conditions of the present invention are satisfied. In light of the pressure resistance of the mold used for the sintering, known reactors and heating furnaces may be used.

In the present invention, as an example, a rod-shaped heater member having a width of 10 to 50 mm, a thickness of 3 to 15 mm, and a length of 100 to 400 mm or a disk-shaped heater member having a diameter of 100 to 400 mm can be produced. Further, the surface roughness of the heater member, i.e., a center-line average roughness (Ra) can be adjusted to a range of 0.01 to 10 μm by polishing depending on the use of heating member.

Further, the silicon carbide sintered body thus obtained can be suitably used for, in addition to the above-described heater member, peripheral members, for example, a fastening bolt and nut used for fixing a terminal, a soaking plate placed above a heater in a device for directly heating a wafer, a heat shielding plate which separates the inside and outside of a furnace, and the like.

It is preferable that the purity of the silicon carbide powder which is a raw material powder of the present invention, of the silicon and carbon sources used in producing the raw material powder, and of the inert gas used for providing the non-oxidizing atmosphere be such that each contains 1 ppm or less of impurity elements, respectively. However, the purities are not limited to the above range provided that they are in a range which allows the desired level of purity to be achieved during the heating and sintering steps. The term "impurity element" used herein means group 1 to group 16 elements in the periodic table of the 1989 revised version of IUPAC Inorganic Chemistry Nomenclature that have an atomic number of three or greater, except for those elements having an atomic number of 6 to 8 and 14.

EXAMPLES

The present invention is described specifically in conjunction with the following two examples, but it is to be understood that the present invention is not limited to these examples and other examples are possible provided that they do not depart from the scope of the present invention.

Example 1

Production of Molded Body 1,410 g of commercially available β-type silicon carbide powder (grade B-HP, produced by H. C. Schtark Co., average particle diameter of 2 μm) and a solution in which 90 g of liquid resol type phenol resin of high purity having a water content of 20% was dissolved in 2,000 g of ethanol were agitated for 18 hours in a planetary ball mill so as to be mixed with each other sufficiently. Then, the mixture was heated to 50 to 60° C. to evaporate ethanol until the mixture became dry, and it was then sieved through a 500 μm sieve to obtain a homogeneous raw material powder of silicon carbide. 1,240 g of this raw material powder was filled in a mold and was pressed at 130° C. for 20 minutes to obtain a disk-shaped molded body having a density of 2.2 g/cm$^3$, an outside diameter of about 30 cm, and a thickness of about 8 mm.

Production of Sintered Body

This molded body was placed in a graphite mold and was subjected to hot pressing under the following conditions. The hot press machine used was a high frequency induction heating 100-t(ton) hot press.

Conditions for Sintering Step

The temperature was increased from room temperature to 700° C. under a vacuum condition of between 10$^{-5}$ to 10$^{-4}$ torr over a six-hour period, and this temperature was maintained for five hours (first temperature increasing stage).

The temperature was increased from 700° C. to 1,200° C. in a vacuum over a three-hour period and was further increased from 1,200° C. to 1,500° C. over an additional three-hour period. This temperature was then maintained for one hour (second temperature increasing stage).

Thereafter, a pressure of 500 kgf/cm$^2$ was applied, and the temperature was increased from 1,500° C. to 2,200° C. in an argon atmosphere over a three-hour period. This temperature was then maintained for one hour (hot press step).

The resultant sintered body had a density of 3.18 g/cm$^3$, a Vickers hardness of 2,500 kgf/mm$^2$, and an electrical resistivity of 0.3 Ω·cm. The obtained sintered body was thermally decomposed by heating processing with acid, and thereafter, was evaluated based on ICP-mass spectrometry and frameless atomic absorption spectroscopy. The results of this evaluation are shown in Table 1 below.

Production of Heater Member

The sintered body thus obtained was subjected to cutting by an electric discharge pressing machine, and a cut surface thereof was polished by a polishing machine to obtain a heater member having a width of 25 mm, a thickness of 5 mm, and a length of 200 mm.

Example 2

Production of High Purity Silicon Carbide Powder 6,800 g of ethyl silicate oligomer of high purity having a silica content of 40% and 3,050 g of liquid resol type phenol resin of high purity having a water content of 20% were mixed with each other and 1,370 g of an aqueous solution having 28% high purity toluene sulfonic acid was added to the mixture as a polymerization or cross-linking catalyst. The mixture was dried to obtain a homogenous resin-like solid product. Then, the obtained solid product was carbonized at 900° C. in a nitrogen atmosphere for one hour. The C/Si ratio of the obtained carbide was found to be 2.4 as a result of elemental analysis. 4,000 g of the carbide was placed in a container made of carbon and the temperature was increased to 1,850° C. in an argon atmosphere. This temperature was maintained for ten minutes, and then the temperature was further increased to 2,050° C. This temperature was maintained for five minutes. Thereafter, the temperature was decreased to obtain a powder having an average particle diameter of 1.3 μm. The content of impurity elements was 0.5 ppm or less.

Production of Molded Body 1,410 g of the silicon carbide powder of high purity obtained by the above-described process and 90 g of liquid resol type phenol resin of high purity having a water content of 20% and dissolved in 2,000 g of ethanol were agitated for 18 hours in a planetary ball mill so as to be mixed with each other sufficiently. Then, the mixture was heated to a temperature of 50 to 60° C. to evaporate ethanol until the mixture became dry, and the mixture was sieved through a 500 μm sieve to obtain a homogenous raw material powder of silicon carbide. 1,190 g of this raw material powder was filled in a mold and was pressed at 130° C. for 20 minutes to obtain a disk-shaped molded body having a density of 2.1 g/cm$^3$, an outside diameter of about 30 cm, and a thickness of about 8 mm.

Production of Sintered Body

This molded body was placed in a graphite mold and was subjected to hot pressing under the following conditions. The hot press machine used was a high frequency induction heating 100-t hot press.

Conditions for Sintering Step

The temperature was increased from room temperature to 700° C. under a vacuum condition of $10^{-5}$ and $10^{-4}$ torr over a six-hour period, and this temperature was maintained for five hours (first temperature increasing stage).

The temperature was increased from 700° C. to 1,200° C. in a vacuum over a three-hour period and was further increased from 1,200° C. to 1,500° C. over an additional three-hour period. This temperature was maintained for one hour (second temperature increasing stage).

Thereafter, a pressure of 500 kgf/cm$^2$ was applied, and the temperature was increased from 1,500° C. to 2,200° C. in an argon atmosphere over a three-hour period. This temperature was then maintained for one hour (hot press step).

The resultant sintered body had a density of 3.15 g/cm$^3$, a Vickers hardness of 2,600 kgf/mm$^2$, and an electrical resistivity of 0.2 Ω·cm. The concentrations of impurities are shown in Table 1 below.

As a result of detailed measurement of the properties of the sintered body obtained by Example 2, it was found that the sintered body had a bending strength at room temperature of 50.0 kgf/mm$^2$, a bending strength at 1,500° C. of 50.0 kgf/mm$^2$, a Young's modulus of $4.1 \times 10^4$, a Poisson's ratio of 0.15, a coefficient of thermal expansion of $3.9 \times 10^{-6}$ ° $C^{-1}$, a thermal conductivity of 200 W/mk or higher, a specific heat of 0.16 cal/g·° C., and a thermal shock resistance of 530ΔT° C. Accordingly, it was confirmed that the resultant sintered body satisfied all of the preferable properties described above.

Production of Heater Member

The sintered body thus obtained was subjected to cutting by an electric discharge processing machine, and a cut surface thereof was polished by a polishing machine to obtain a heater member having a width of 25 mm, a thickness of 5 mm, and a length of 200 mm.

Comparative Example 1

Production of Molded Body 1,410 g of a commercially available β-type silicon carbide powder (grade B-HP, produced by H. C. Schtark Co., average particle diameter of 2 μm), 1.1 g of boron carbide (B$_4$C), and a solution of 90 g of liquid resol type phenol resin of high purity having a water content of 20% dissolved in 2,000 g of ethanol were agitated for 18 hours in a planetary ball mill so as to be mixed together sufficiently. Then, the mixture was heated to a temperature of 50 to 60° C. to remove and evaporate ethanol until the mixture became dry, and the dried mixture was sieved through a 500 μm sieve to obtain a homogeneous raw material powder of silicon carbide. 1,240 g of this raw material powder was filled in a mold and was pressed at 130° C. for 20 minutes to obtain a disk-shaped molded body having a density of 2.2 g/cm$^3$, an outside diameter of about 30 cm, and a thickness of about 8 mm.

Production of Sintered Body

This molded body was placed in a graphite mold and was subjected to hot pressing under the following conditions. The hot press machine used was a high frequency induction heating 100-t hot press.

Conditions for Sintering Step

The temperature was increased from room temperature to 700° C. under a vacuum condition of $10^{-5}$ to $10^{-4}$ torr over a six-hour period. This temperature was maintained for five hours (first temperature increasing stage).

The temperature was increased from 700° C. to 1,200° C. in a vacuum over a three-hour period and was further increased from 1,200° C. to 1,500° C. over an additional three-hour period. This temperature was then maintained for one hour (second temperature increasing stage).

Thereafter, a pressure of 150 kgf/cm$^2$ was applied, and the temperature was increased from 1,500° C. to 2,200° C. in an argon atmosphere over a three-hour period. This temperature was then maintained for one hour (hot press step).

The resultant sintered body had a density of 3.18 g/cm$^3$, a Vickers hardness of 2,400 kgf/mm$^2$, and an electrical resistivity of 108 Ω·cm. The concentrations of the impurities are shown in Table 1 below.

Production of Heater Member

The sintered body thus obtained was subjected to cutting by an electric discharge processing machine, and a cut surface thereof was polished by a polishing machine to obtain a heater member having a width of 25 mm, a thickness of 5 mm, and a length of 200 mm.

Comparative Example 2

A commercially available high purity heater member made of graphite (having a density of 1.65/cm$^3$, a Vickers hardness of 350 kgf/mm$^2$, and an electrical resistivity of $2.4 \times 10^{-3}$ Ω·cm) was used.

The concentrations of the impurities are shown in Table 1 below.

TABLE 1

Concentrations of Impurities of Sintered Bodies (unit: ppm)

|    | Example 1 | Example 2 | Comparative Example 1 | Comparative Example 2 |
|----|-----------|-----------|-----------------------|-----------------------|
| B  | 0.8       | 0.00      | 1,000 or more         | 0.05                  |
| Al | 48        | 0.02      | 55                    | 0.03                  |
| Na | 3         | 0.03      | 10                    | 0.12                  |
| K  | 1.2       | 0.00      | 1.0                   | 0.06                  |
| Mg | 5         | 0.05      | 4                     | 0.04                  |
| Ti | 2         | 0.02      | 5                     | 0.06                  |
| Cr | 5         | 0.00      | 7                     | 0.04                  |
| Fe | 33        | 0.03      | 48                    | 0.08                  |
| Ni | 4         | 0.01      | 5                     | 0.04                  |
| Co | 4         | 0.03      | 3                     | 0.01                  |
| W  | 1.2       | 0.00      | 1.0                   | 0.00                  |
| Cu | 0.5       | 0.00      | 0.8                   | 0.02                  |

The heat generating stability, degree of contamination, and acid resistance were evaluated for each of the heater members of the above-described Examples and Comparative Examples. The respective methods of evaluation will be described below.

Evaluation of Heat Generating Stability

In each of the heater members (rod-shaped heaters) of the Examples and Comparative Examples, volume resistivity was measured by a four-terminal process at a plurality of measurement points (18 points) provided at intervals of 10 mm from end to end thereof, and an average value and a range of variation were obtained therefrom to evaluate the heat generating stability for each heater member. The results of this evaluation are given in Table 2 below.

Evaluation of Durability in Oxidizing Atmosphere

A terminal for electric power supply was mounted to an end of each of the rod-shaped heaters of the Examples and Comparative Examples, and an electric current of 10 to 15 amperes (A) was applied thereto in an atmosphere mainly of oxygen. The temperature was increased to 1,200° C. and maintained thereat. After heating for the total period of about 30 hours, the weight loss of each rod-shaped heater (%)[1−(weight of heater member after testing)/(weight of heater member before testing)×100] was obtained as a measure of durability of the heater member.

The results of this evaluation are shown in Table 2 below. The heater formed by a sintered body of Comparative Example 1, which was obtained by using a boron-based sintering auxiliary, was found to have an extremely high volume resistivity so as to make flow of a predetermined electric current difficult. Accordingly, this heater was judged to be undesirable as a heater.

Evaluation of Wafer Contamination

Each of the rod-shaped heaters of the Examples and Comparative Examples was placed on a silicon wafer, and the temperature was increased to 1,000° C. in an atmosphere of inert gas and then kept at that temperature for 20 hours. Thereafter, the wafer was cooled down to room temperature. The number of atoms of iron within 1 μm from the surface of the wafer on which the heater member was placed was confirmed. The results of this evaluation are shown in Table 2 below.

TABLE 2

| | | Example 1 | Example 2 | Comparative Example 1 | Comparative Example 2 |
|---|---|---|---|---|---|
| Volume resistivity (Ω cm) | average value | $8.5 \times 10^{-2}$ | $3.0 \times 10^{-2}$ | $4.2 \times 10^4$ | $2.4 \times 10^{-3}$ |
| | range of variation | $3.9 \times 10^{-2}$ to $9.1 \times 10^{-2}$ | $2.2 \times 10^{-2}$ to $3.6 \times 10^{-2}$ | $3.1 \times 10^3$ to $8.8 \times 10^4$ | $1.9 \times 10^{-3}$ to $2.9 \times 10^{-3}$ |
| Durability in an Oxidizing Atmosphere (weight loss (%)) | | 0.8 | 0.5 | measurement was impossible | 4.0 or more |
| Degree of Wafer Contamination (atoms/cm$^2$) | | $6.2 \times 10^{13}$ | $2.5 \times 10^{10}$ | $8.4 \times 10^{15}$ | $1.8 \times 10^{10}$ |

As is apparent from the Examples and Comparative Examples, the silicon carbide sintered bodies obtained by the Examples according to the process of the present invention are found to be sintered bodies each having a sufficient density, an extremely low content of impurities, excellent durability in an oxidizing atmosphere, an electric resistivity suitable for a heater member, and a highly stabilized range of variation. Further, the degree of wafer contamination is also low, and thus, these sintered bodies can each be advantageously used as a heater for manufacturing a semiconductor.

In accordance with the present invention, it is possible to obtain a heater member which exhibits good durability in an oxidizing atmosphere, in a vacuum atmosphere, and even in a corrosive atmosphere, and which has excellent uniformity in temperature and a low degree of contamination.

What is claimed is:

1. A process for making a heater member comprising a silicon carbide sintered body, the process comprising:
   providing a silicon carbide powder consisting essentially of silicon carbide particles that have an average particle diameter of 0.01 to 5 μm;
   forming a mixture consisting essentially of the silicon carbide powder and a non-metal-based sintering additive, the non-metal-based sintering additive consists essentially of a non-metal based sintering auxiliary that produces carbon upon heating and that covers the surface of silicon carbide powder;
   sintering the mixture in a non-oxidizing atmosphere to obtain a silicon carbide sintered body having a density of at least 2.9 g/cm$^3$; and
   forming a heater member from the silicon carbide sintered body.

2. The process of claim 1, wherein the mixture is sintered at a temperature of 2,000° C. to 2,400° C. and under a pressure of 300 to 700 kgf/cm$^2$.

3. The process of claim 1, wherein the non-metal-based sintering auxiliary is mixed with the silicon carbide powder in an amount of 10 wt % or less.

4. The process of claim 1, further comprising prior to sintering the mixture:
   gradually heating the mixture from room temperature to a temperature of 700° C. in a vacuum;
   heating the mixture from a temperature of 700° C. to a temperature of 1,500° C. over a selected period of time; and
   maintaining the mixture at a temperature of 1,500° C. for a selected period of time.

5. The process of claim 1, further comprising prior to sintering the mixture:
   placing a homogeneous mixture of the silicon carbide powder and the non-metal-based sintering auxiliary in a mold; and
   heating the homogeneous mixture under pressure at a temperature of from 80° C. to 300° C. for 5 to 60 minutes to produce a molded body.

6. The process of claim 1, wherein the non-metal-based sintering auxiliary is dissolved in a solvent and mixed with the silicon carbide powder.

7. The process of claim 1, wherein the powder making process for making the silicon carbide powder comprises:
   solidifying a mixture of a silicon source containing at least one liquid silicon compound, a carbon source containing at least one liquid organic compound that produces carbon upon heating, and a catalyst to form a solid product;
   heating the solid product in a non-oxidizing atmosphere to carbonize the solid product; and
   heating the carbonized solid product to obtain the silicon carbide powder.

8. A process for making a heater member comprising a silicon carbide sintered body, the process comprising:
   providing a silicon carbide powder consisting essentially of silicon carbide particles;
   forming a mixture consisting essentially of the silicon carbide powder and a non-metal-based sintering additive, the non-metal-based sintering additive consists essentially of a non-metal based sintering auxiliary that produces carbon upon heating and that covers the surface of silicon carbide powder;
   sintering the mixture in a non-oxidizing atmosphere to obtain a silicon carbide sintered body having a density of at least 2.9 g/cm$^3$ and a total impurity content of 5 ppm or less; and
   forming a heater member from the silicon carbide sintered body.

9. The process of claim 8, wherein the silicon carbide sintered body has a total impurity content of 1 ppm or less.

10. The process of claim 8, wherein the silicon carbide sintered body has a density of at least 3.0 g/cm$^3$.

11. The process of claim 8, wherein the silicon carbide sintered body has a volume resistivity of 10 Ωcm or less.

12. The process of claim 8, wherein the mixture is sintered at a temperature of 2,000° C. to 2,400° C. and under a pressure of 300 to 700 kgf/cm$^2$.

13. The process of claim 8, wherein the non-metal-based sintering auxiliary is mixed with the silicon carbide powder in an amount of 10 wt % or less.

14. The process of claim 8, further comprising prior to sintering the mixture:

gradually heating the mixture from room temperature to a temperature of 700° C. in a vacuum;

heating the mixture from a temperature of 700° C. to a temperature of 1,500° C. over a selected period of time; and maintaining the mixture at a temperature of 1,500° C. for a selected period of time.

15. The process of claim 8, further comprising prior to sintering the mixture:

placing a homogeneous mixture of the silicon carbide powder and the non-metal-based sintering auxiliary in a mold; and heating the homogeneous mixture under pressure at a temperature of from 80° C. to 300° C. for 5 to 60 minutes to produce a molded body.

16. The process of claim 8, wherein the non-metal-based sintering auxiliary is dissolved in a solvent and mixed with the silicon carbide powder.

17. The process of claim 8, wherein the powder making process for making the silicon carbide powder comprises:

solidifying a mixture of a silicon source containing at least one liquid silicon compound, a carbon source containing at least one liquid organic compound that produces carbon upon heating, and a catalyst to form a solid product;

heating the solid product in a non-oxidizing atmosphere to carbonize the solid product; and heating the carbonized solid product to obtain the silicon carbide powder.

18. The process of claim 8, wherein the silicon carbide particles have an average particle diameter of 0.01 to 5 μm.

19. A process for making a heater member comprising a silicon carbide sintered body, the process comprising:

providing a silicon carbide powder consisting essentially of silicon carbide particles;

forming a mixture consisting essentially of the silicon carbide powder and a non-metal-based sintering additive, the non-metal-based sintering additive consists essentially of a non-metal based sintering auxiliary that produces carbon upon heating and that covers the surface of silicon carbide powder;

sintering the mixture in a non-oxidizing atmosphere to obtain a silicon carbide sintered body having (i) a density of at least 2.9 g/cm$^3$, (ii) a total impurity content of 5 ppm or less and (iii) a volume resistivity of 10 Ωcm or less; and forming a heater member from the silicon carbide sintered body.

20. The process of claim 19, wherein the silicon carbide sintered body has a total impurity content of 1 ppm or less and a density of at least 3.0 g/cm$^3$.

21. The process of claim 19, wherein the mixture is sintered at a temperature of 2,000° C. to 2,400° C. and under a pressure of 300 to 700 kgf/cm$^2$.

22. The process of claim 19, wherein the non-metal-based sintering auxiliary is mixed with the silicon carbide powder in an amount of 10 wt % or less.

23. The process of claim 19, further comprising prior to sintering the mixture:

gradually heating the mixture from room temperature to a temperature of 700° C. in a vacuum;

heating the mixture from a temperature of 700° C. to a temperature of 1,500° C. over a selected period of time; and maintaining the mixture at a temperature of 1,500° C. for a selected period of time.

24. The process of claim 19, further comprising prior to sintering the mixture:

placing a homogeneous mixture of the silicon carbide powder and the non-metal-based sintering auxiliary in a mold; and heating the homogeneous mixture under pressure at a temperature of from 80° C. to 300° C. for 5 to 60 minutes to produce a molded body.

25. The process of claim 19, wherein the powder making process for making the silicon carbide powder comprises:

solidifying a mixture of a silicon source containing at least one liquid silicon compound, a carbon source containing at least one liquid organic compound that produces carbon upon heating, and a catalyst to form a solid product;

heating the solid product in a non-oxidizing atmosphere to carbonize the solid product; and heating the carbonized solid product to obtain the silicon carbide powder.

26. The process of claim 19, wherein the silicon carbide particles have an average particle diameter of 0.01 to 5 μm.

* * * * *